United States Patent [19]

Kunze et al.

[11] 4,015,338
[45] Apr. 5, 1977

[54] METHOD AND APPARATUS FOR CONTROL MEASUREMENT OF A MOTOR VEHICLE FRAME AND OR AGGREGATES CONNECTED THERETO

[75] Inventors: Lutz Kunze, Sindelfingen; Kurt Knapp, Neuhausen; Klaus Brammer, Stuttgart, all of Germany

[73] Assignee: Daimler-Benz Aktiengesellschaft, Germany

[22] Filed: Aug. 28, 1974

[21] Appl. No.: 501,356

[30] Foreign Application Priority Data

Aug. 28, 1973 Germany .......................... 2343270

[52] U.S. Cl. ..................................... 33/228; 33/193; 33/288; 356/138; 33/203.18
[51] Int. Cl.² ......................................... G01C 15/12
[58] Field of Search ............. 356/172, 138; 33/193, 33/288, 227, 228, 286, 293, 203, 203.18, 335

[56] References Cited

UNITED STATES PATENTS

| | | | |
|---|---|---|---|
| 3,162,950 | 12/1964 | Hykes | 33/193 X |
| 3,188,741 | 6/1965 | Jeansson et al. | 33/227 X |
| 3,550,277 | 12/1970 | Selnes | 33/193 |
| 3,566,476 | 3/1971 | McWhorter | 33/193 X |
| 3,611,575 | 10/1971 | Chartier | 33/288 |
| 3,822,943 | 7/1974 | Mason | 356/138 |

*Primary Examiner*—William D. Martin, Jr.
*Attorney, Agent, or Firm*—Craig & Antonelli

[57] ABSTRACT

A method and apparatus for undertaking control measurements of a measurement object such as a motor vehicle frame or unit installed thereon, in which a directional beam or beams are used which extend only parallel to one coordinate axis and in which only one light source is used which emits directional beams toward one or two sides; only one parallel guidance coordinated thereto is provided which is securely connected at least indirectly with the vehicle, extending preferably perpendicularly to the vehicle longitudinal axis underneath the vehicle floor; the position of the control points perpendicular to the direction of the parallel guidance will be determined by direct mechanical measurements of the distance between the corresponding plumbing rulers, on the one hand, and the parallel guidance or a fixed point at the beam source, on the other.

64 Claims, 5 Drawing Figures

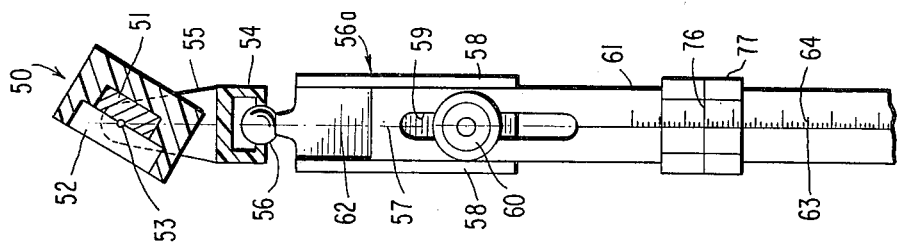
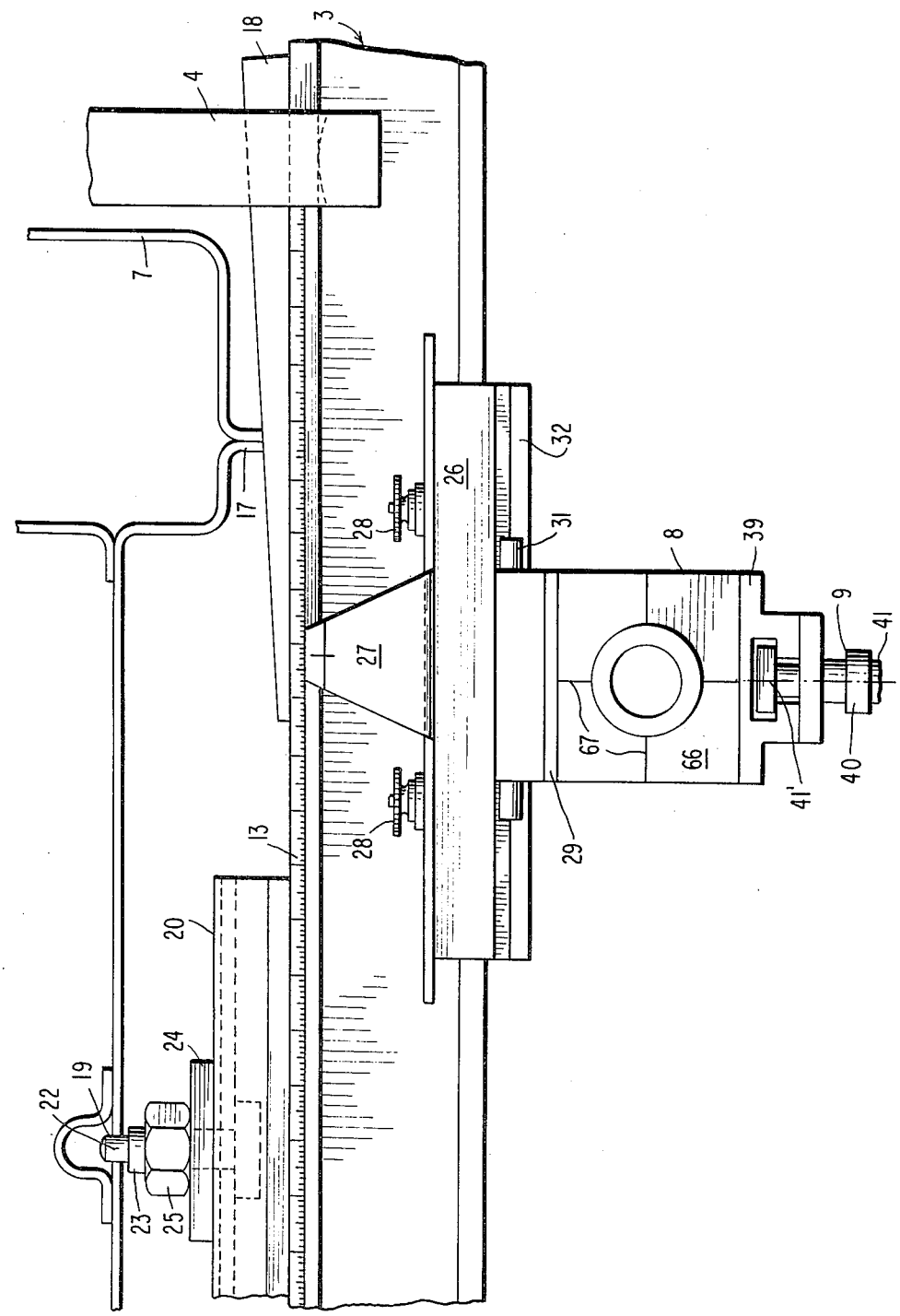

METHOD AND APPARATUS FOR CONTROL MEASUREMENT OF A MOTOR VEHICLE FRAME AND OR AGGREGATES CONNECTED THERETO

The present invention relates to a method for carrying out control- or check-measurements of a motor vehicle frame provided with the intended position according to known control or check points and/or other chassis or drive aggregates installed thereon (measurement objects), in which a coordinate plane determined by rectilinearly expanding light beams and by parallel guidances for the light beam source, which are provided with measuring rods or poles and extend at least approximately perpendicularly to the light beams, is aligned as accurately as possible parallel to the floor plane of the motor vehicle and to the vehicle longitudinal axis by means of at least three check points whose deviation from the intended position is zero or as is known, and in which plumbing arms or rulers are suspended at the control points for plumbing or projecting the control points into the coordinate plane and for the determination of their vertical coordinates, and in which the actual position of the remaining control or check points is determined in the coordinate system.

This known method utilizes two parallel guidances for the directional beams arranged at right angle to one another, which form so to speak of the horizontal coordinate axes of the system. One of these parallel guidances is disposed laterally parallel adjacent the vehicle and the other parallel guidance is disposed at the same height transversely in front of the vehicle. The vehicle itself is jacked up so that the vehicle floor comes to lie somewhat higher than the horizonal coordinate plane determined by the parallel guidances. No connection exists between the vehicle and the parallel guidances. A laser beam transmitter is arranged at the free end of the parallel guidance arranged adjacent the vehicle which transmits or radiates the laser beam in the direction of the parallel guidance and which is deflected by a mirror arranged in a carriage or slide perpendicularly to the parallel guidance in the direction toward the vehicle. It is similar in connection with the transversely arranged parallel guidance. The laser beam is deflected in the longitudinal direction of the other parallel guidance by a deflecting mirror at the cross-over place of the two parallel guidances and is deflected by a further mirror arranged on a guide carriage or slide at right angle to the guidance in the direction of the vehicle longitudinal axis. The two mirrors which are arranged on the guide carriages or slides and which deflect the laser beam at right angle to the respective guidance may be so aligned that the reflected beam extends exactly parallel to a main axis of the vehicle. These mirrors are referred to in the aforementioned type of equipment as beam source, for only from that point the directed beams assume their output. The beam path disposed ahead of the mirror is considered, so to speak, of, only as energy supply of the beam source. The coordinates of the measurement points within the horizontal coordinate plane are determined by adjustment of the directional beams onto the corresponding plumbing ruler or arm and by reading-off of the coordinate values on the scales mounted at the guidances. The vertical coordinate is determined at the plumbing arm or ruler.

This type of method presupposes as regards the apparatus, certain means and equipments which have proved themselves as extremely disadvantageous in practice. A serious disadvantage resides in that the coordinate system determined by the guide rails of the directional beam source is not connected with the vehicle and by reason of the size of the guidances cannot be connected at all in practice. By reason of the absence of a mutual coupling between the vehicle and the reference system for the measurement, the alignment of the coordinate system with respect to the vehicle is lost after completion of an alignment work and the coordinate system has to be realigned tediously for checking the alignment work. Much time is lost as a result thereof.

A further disadvantage for the apparatus required for the prior art methods resides in the long paths to be traversed by the directional beams. In order to achieve a sharp picture of the focused light beam enabling the accurate reading of the beam position on the plumbing arms or rulers arranged at different depths of relatively large difference—one should not have to work in darkened but instead in brightly illuminated spaces and a continuous focusing of the directional beam onto the respective plumbing arm is to be avoided for time reasons and for reasons of the alignment accuracy of the beam—laser light was used in a consequential manner with the prior art methods. The danger that such a light beam may, on the one hand, hit the eye of an operating person, however, is far too great. Laser light, even in small intensities or over small periods of time is extremely harmful for the eye. This characteristic and property of the laser light puts the aforementioned check measurement method for the provided application beyond discussion for practical reasons; on the other hand, however, the laser light appears to be indispensable for such a check measurement method because in the instant application no reasonable alternative exists for the beam concentration over so large a depth of field.

Apart from the two aforementioned disadvantages, namely, of the freedom of the measurement coordinate system with respect to the vehicle subjected to vibrations during the work and of the large required depth focus range, which makes the laser light necessary, there exists in the prior art method a still further disadvantage, and more particularly in the fact that the apparatus required therefor is very expensive. The installation is not only expensive by reason of its size and sensitivity but it also renders costly carrying out the method in that this apparatus in practice requires its own measurement space which is practically lost for other work purposes. Since the sensitive guide rails have to be arranged, not on the floor, but by reason of the adjusting operations at the directional beam sources approximately at table height, the space about the vehicle is impaired by these guide rails. The vehicle itself has to stand on its own wheels on a measurement table or the like in order that all parts are under the rated load, i.e., under the normal load of the vehicle. This measurement table, however, impairs the space between the guide rails for other work. The application of the prior art method, therefore, presupposes in addition to the acquisition of the corresponding apparatus itself, also the readying of a measurement space and of an elevating platform.

Therebeyond, complete measurements in the wheel shadow when working in the assembly pit are either not possible at all or only after disassembly of the wheels. However, it is necessary for a completely satisfactory measurement that the vehicle stands on its wheels because the positions of the check or measurement points must always be determined under normal design load. A completely satisfactory measurement and checking of drive-chassis aggregates within the wheel area is therefore not possible only if the wheel impairing the directional beam is replaced by a narrow support, which again presupposes individual parts tied to a given vehicle type. This renders additionally costly the application of the prior art method by reason of the large number of vehicle types and type changes. This exchange additionally involves a time loss and the inward spring deflection conditions may change by the mounting of a support. A steering wheel deflection is prevented by such a support. Measurements precisely within the wheel area for determining the drive-chassis geometry and the agreement thereof or deviation thereof from the design data is, however, particularly important.

The prior art method therefore entails the described disadvantages which will be summarized once again by the following topical designations:

Movability of the vehicle in the measuring system,

Large depth of focusing range, laser light directional beams,

Its own measurement space, costly in acquisition, and

Impairment of the measurements in the wheel area.

Those are the disadvantages which quite seriously jeopardize in part the application of the method. It is the aim of the present invention to eliminate these disadvantages. This is achieved according to the present invention in that directional beams exclusively parallel to one of the coordinate axes are used and in that exclusively one beam source radiating directional beams on one or both sides is used and correspondingly only one parallel guidance coordinated thereto is provided and in that the parallel guidance is at least indirectly securely connected with the vehicle, preferably is rigidly connected with the vehicle floor, preferably extending perpendicularly to the vehicle longitudinal axis underneath the vehicle floor, and in that the position of the check points perpendicular to the direction of the parallel guidance, preferably in the direction of the coordinate axis extending parallel to the vehicle longitudinal axis is determined by direct mechanical measurements of the distance between the corresponding plumbing arms or rulers, on the one hand, and the parallel guidance or a fixed point at the beam source, on the other.

By reason of the use of only one directional beam source which is preferably arranged approximately in the vehicle center movable transversely underneath the vehicle, the distances from the beam source to the plumbing arms suspended at the check points are considerably reduced also or especially in the application of the present invention to commercial vehicles such as, for example, trucks or buses so that the required depth of focusing range is considerably smaller and laser light can be dispensed with. Since the cross guidance of the light source is rigidly connected with the vehicle, a relative movement of the vehicle within the measurement system is impossible. In case of positional changes of the vehicle of the order of magnitude of, for example, greater than the measurement accuracy of the apparatus, which are initiated, for example, by alignment operations or work at frame parts, the measurement and reference system is moved along correspondingly and a relative positional change is excluded. The measurement accuracy is improved thereby and a repeated alignment of the reference system after an alignment operation or work at the frame parts becomes superfluous as a result thereof. The time required for repairs may be shortened considerably as a result thereof. By reason of the method according to the present invention the apparatus required therefor can be considerably smaller compared to the prior art apparatus and can be more handy and therewith more inexpensive and is not tied locally. It may be used with any assembly pit, i.e., makes necessary neither an elevating platform nor a measurement space, and therefore does not presuppose any follower installations and is acceptably inexpensive in its application. Since the longitudinal and cross coordinates of the measurement points can be determined from the vehicle bottom side, also any measurement impairment by the wheels is obviated. The drive-chassis aggregates are always between the wheels, consequently the plumbed measurement points disposed at the same are therefore always attainable by directional beams from the vehicle floor.

In one embodiment of the present invention an installation for carrying out the control measurement method according to the present invention is proposed, which includes a rectilinear guide bearer that is as flat as possible and as bending-resistant as possible in the vertical direction, which is equipped with a prismatic guidance, absorbing canting forces in all three directions, for the guide carriage of a light source, projector or the like and additionally is provided with means for clamping the same to the vehicle floor.

Frequently, motor vehicles include at least one control bore or the like at the frame floor at places particularly protected with respect to deformations caused by accidents, which is or are preferably arranged approximately in the center area of the vehicle. In order to facilitate the alignment of the guide bearer relative to the vehicle, provision is therefore made that at least one indexing means, for example, an indexing bolt is mounted or provided at the side of the guide bearer facing the vehicle floor which is adapted to be clamped preferably in different positions at the guide bearer and is coordinated to an indexing means, for example, an indexing bore or the like associated with a place of the vehicle floor that is protected against accidents. In order to be able to adapt the guide bearer to all possible types also in that regard, the aforementioned locally changeable clamping ability of the indexing bolt is provided.

In order to facilitate the fastening of the guide bearer at the vehicle floor, one longitudinally displaceable fixing bracket each may be arranged at the top side of the guide bearer at each end, which engages from below over a floor lateral longitudinal girder of the vehicle when the vehicle door is opened.

In order to be able to carry out also measurements on the outside of the wheel, it is appropriate if the guide bearer is at least as long as the width of the widest vehicle to be measured, preferably is at least longer by twice the guide carriage width than the width of the widest vehicle to be measured.

For purposes of adjusting the directional beam in the horizontal position, means for adjusting the optical axis of the light source about the cross axis of the vehicle (horizontal alignment of the optical axis), are arranged appropriately at the guide bearer and/or at the guide carriage. In a similar manner, means for adjusting the optical axis of the light source about the vertical axis of the vehicle are arranged at the guide bearer for the longitudinal alignment of the directional beam parallel to the vehicle longitudinal direction in such a manner that the accurately determined relative angle which is accurately determined to be 90°, between the direction of displacement of the guide carriage on the guide bearer and the optical axis of the light source remains unchanged. The maintenance of the perpendicular relative angle between guide rail and light beam is necessary because with the longitudinal alignment of the light beam also the guide rail is aligned transversely. An accurate cross alignment of the rail perpendicular to the vehicle longitudinal axis, however, is necessary by reason of the longitudinal coordinate determination emanating indirectly from the rail. For the alignment of the guide rail in the horizontal direction, means for the adjustment of the cross-inclination of the guide tracks of the guide bearer (horizontal alignment of the guidance) are provided appropriately at the guide bearer.

In order to be able to illuminate also measurement or control points adapted to be directly engaged by the directional beams or in order to be able to determine only the mutual deviation in the horizontal direction of two at least approximately superposed measurement or check point, means may be provided which enable the light beam to be pivoted or swung up and down in a vertical plane without losing the adjusted horizontal position of the optical axis as a result thereof. This pivot movement may be effected by means of a pivotal suspension of the light source and of a detent or locking means in the aligned intended position. However, it can also be effected by means of a pivotally supported prism placed in the path of the light beam. In a similar manner, means may be provided for the level control of two measurement or check points disposed adjacent one another, by means of which the light beam is adapted to be pivoted to and fro in a horizontal plane without loss of the adjusted longitudinal alignment of the optical axis as a result thereof. With an arrangement of the pivotal bearing support of the prism rotatable about the light beam, the same prism may be used for the vertical and the horizontal pivotal movement. Pivotal movements of the directional beam are then also possible in any desired intermediate planes so that the uniform position of certain check or measurement points in any predetermined inclined plane parallel to the vehicle longitudinal axis can be controlled therewith.

In order to be able to fix the zero point of the cross-coordinate measurement system accurately to a predetermined cross or transverse position independently of the position of the fastening of the guide bearer at the vehicle floor, it is advantageous if a scale calibrated in length units and cooperating with a position indicator mounted at the guide carriage is mounted at the cross guidance, which permits to read off the transverse position of the light source on the guide bearer, and if means are provided which, with an unchanged position of the guide carriage on the guide bearer, permit a relative displacement and adjustment between the scale and the position indicator.

In order that, starting from the guide bearer, measurements are possible in the forward and rearward direction, the light source, the projector or the like is advantageously so constructed that it is able to transmit or radiate directional beams in both directions along the optical axis without the need of pivoting the same through 180°.

Of course, also longitudinal coordinate measurements in both directions are to be possible. In order to enable this in a simple manner, a roller-type measuring tape pivotal through 180° is pivotally mounted at the guide carriage or at the light source, the projector or the like about a pivot bolt or the like disposed with its axis coinciding with the optical axis in a vertical plane, whose pulled-out length indicates the distance from the tape tip to the center of the pivot bolt or the like. In order to be able to determine the zero or other reference point for the longitudinal coordinate determination, it is appropriate if the pivot bolt or the like is displaceable on its support in the vehicle longitudinal direction and is adapted to be fixed in any desired longitudinal position within the adjusting path.

In order that also slight inclinations of surfaces with respect to the horizontal and/or transverse direction can be detected qualitatively by reflection of the light beam at a mirror mounted at the surface, it is appropriate if a cross wire provided with scale marks is projected by the projector and if the end face or faces of the projector is or are constructed as plane bright projection surface provided with a wire cross and disposed perpendicular.

Accordingly, it is an object of the present invention to provide a method and apparatus for control measurements of a motor vehicle frame or of aggregates connected thereto which avoids by simple means the aforementioned shortcomings and drawbacks encountered in the prior art.

Another object of the present invention resides in a method and apparatus for carrying out control or check measurements at motor vehicle frames or chassis aggregates connected thereto which are simple in construction, relatively inexpensive in original cost and relatively less time-consuming and easier to handle than the prior art methods and apparatus.

A further object of the present invention resides in a method and installation for carrying out control or check measurements at motor vehicle frames and/or aggregates connected thereto which eliminate repeated re-alignment of the system after each repair work and which is relatively safe to the personnel using the same.

Still another object of the present invention resides in a method and apparatus of the type described above which obviates the need for laser beams, elevating platforms and separate measurement spaces to enable proper use thereof.

Another object of the present invention resides in a method and installation for carrying out control measurements or check measurements at motor vehicles which can be readily used with any number of vehicle types and dispenses with the need of measurement stations involving large space requirements.

A further object of the present invention resides in a method and installation for control measurements in motor vehicles, particularly of motor vehicle frames and aggregates connected thereto, which enable relatively fast measurements with the use of a relatively small size equipment.

These and other objects, features and advantages of the present invention will become more apparent from the following description when taken in connection with the accompanying drawing which shows, for purposes of illustration only, one embodiment in accordance with the present invention, and wherein:

FIG. 4 is an end elevational view of the installation of FIG. 3; and

FIG. 5 is a somewhat schematic elevational view, partly in cross section, through a plumbing arm in accordance with the present invention.

Figure 1:
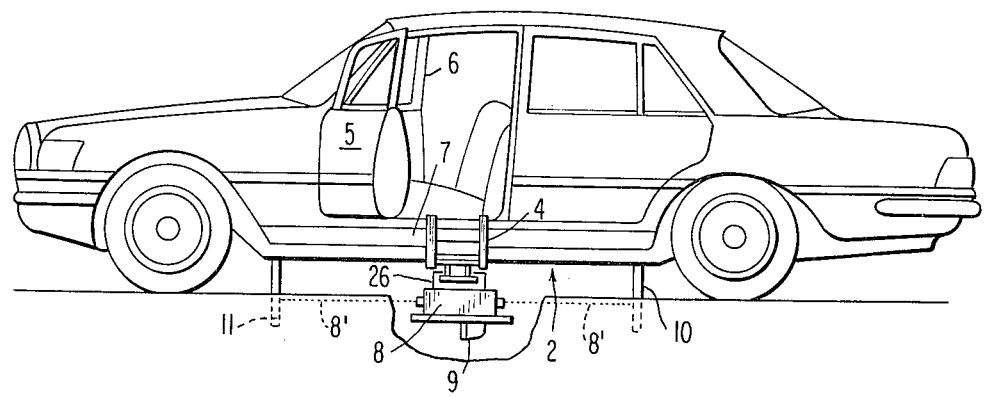
FIG. 1 is a somewhat schematic side elevational view of a motor vehicle with a measurement installation in accordance with the present invention and illustrating the application of the method and apparatus in accordance with the present invention during the floor measurement of a passenger motor vehicle.
Figure 2:
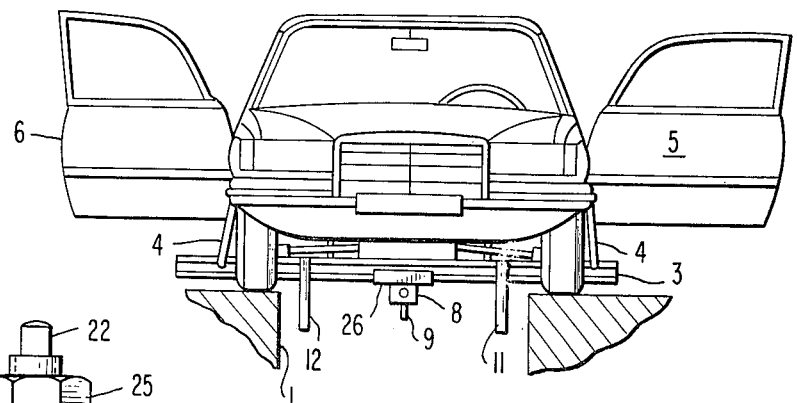
FIG. 2 is a somewhat schematic front elevational view of the vehicle and measuring installation of FIG. 1.

Referring now to the drawing wherein like reference numerals are used throughout the various views to designate like parts, and more particularly to FIGS. 1 and 2, a guide bearer 3 (FIGS. 2 and 4) is clamped from below to the vehicle floor generally designated by reference numeral 2 (FIG. 1) transversely to the motor vehicle which is placed over an assembly pit 1 and stands on its own wheels, as shown in side and front elevational view use in these two FIGS. 1 and 2. The guide bearer 3 is held fast by means of two fixing brackets 4 which are suspended from the floor lateral girders 7 (FIG. 1) exposed by the opened vehicle doors 5 and 6, and is immovably pressed from below against the bottom side of the vehicle. Prior to the clamping, the guide bearer 3 has to be aligned accurately at right angle to the vehicle longitudinal axis and parallel to the normal floor plane of the vehicle. The guide bearer 3 is an accurately rectilinear bending-rigid and flat bearer so that it can be installed without difficulty and without impairment, on the one hand, also in vehicles with small road clearance and assembly with high with rim edge, and, on the other, also with a vehicle that spring-deflects inwardly. The bending-rigidity of the bearer and its rectilinearity assured also under the influence of clamping forces and the weight of measuring apparatus, assumes an accurate rectilinear guidance of the measuring apparatus along the cross axis of the vehicle. The guide bearer 3 is provided with a measuring scale 13 (FIG. 4) in order to be able to read off the respective width position of the measurement apparatus at the guide bearer 3.

The measurement apparatus arranged at the guide bearer 3 and guided transversely to the vehicle longitudinal axis includes a projector 8 radiating a directional beam toward both sides and accurately aligned with its optical axis in the horizontal and vertical direction parallel to the vehicle longitudinal axis, and a roller type measuring tape 9 secured at the bottom thereof. Plumbing arms or rulers 10, 11 and 12 are additionally suspended at the vehicle floor at the control or check points to be measured. This may be realized, for example, by way of a permanent magnet head and a universal, readily movable ball joint between the magnetic head and a plumbing arm to be described more fully hereinafter by reference to FIG. 5. The plumbing arms or rulers are provided with a scale graduated in length units and displaceable in the height direction, if necessary, and may additionally include an intended mark adjuster. Owing to the ball joint, they are suspended vertically downwardly and can be pivoted about the vertical axis in such a manner that they are disposed transversely to the directional beam and offer a projection surface to the same.

A coordinate plane is determined by the guide bearer 3 mounted aligned at the vehicle, and by the aligned directional beam 8' (FIG. 1) of the projector 8, which is securely connected with the vehicle and partakes in every movement of the vehicle which occurs during repair work or operations. The measurement insallation does not require any separate measurement space for its use but may be utilized in any assembly pit as are encountered also in the simplest motor vehicle repair shop and which is required anyhow for undertaking repairs at the frame or chassis—for that purpose the vehicle has to stand, for the most part on its wheels. By reason of the arrangement of the measurement installation approximately in the vehicle center, the required depth of focusing range is relatively short, namely, at a maximum, half the vehicle length. This depth of focusing range is attainable with normal harmless light beams exclusively from the visible wavelength range and with normal projectors. A bearing is taken by means of the light beam in the longitudinal direction on the plumbing arms of the measurement or check points and their width position is determined in this manner—to be readoff at the length unit scale on the guide bearer 3—while the longitudinal position thereof is determined by pulling out the roller-type measuring tape 9 up to the plumbing arm. The height position of the measurement or check point is determined at the plumbing arms or rulers.

Figure 3:
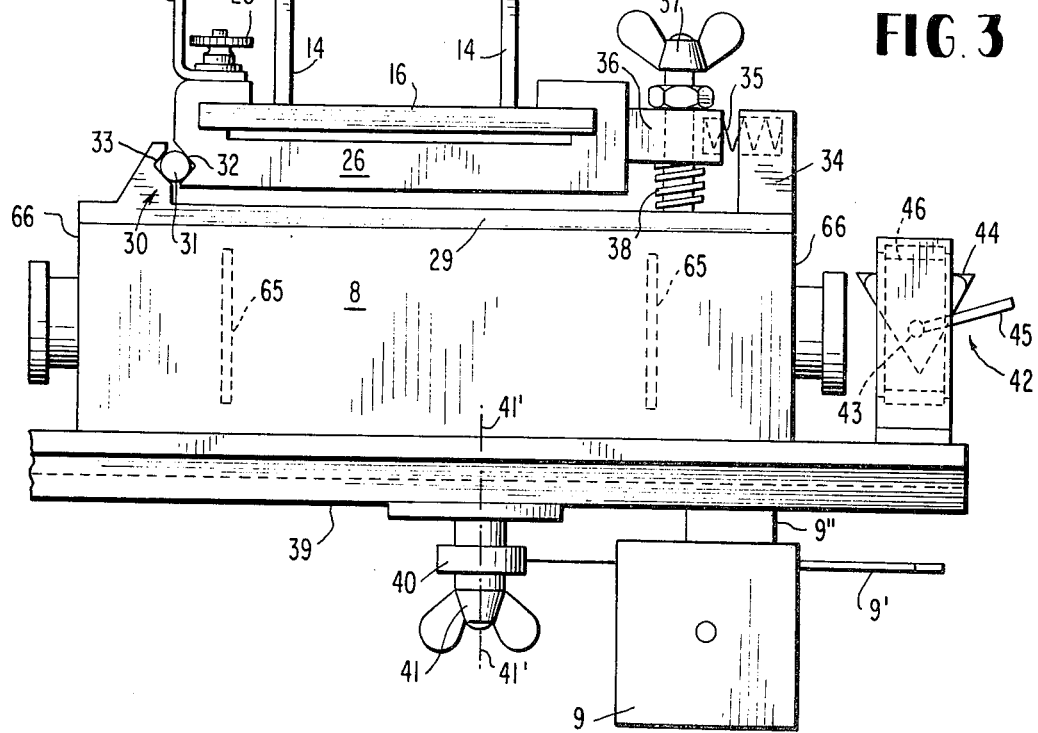
FIG. 3 is a somewhat schematic side elevational view of an installation for carrying out the measurements in accordance with the present invention.

After these basic explanations relating to the method during the measurement and to the arrangement of the measuring apparatus at the vehicle, the measurement apparatus illustrated in FIGS. 3, 4 and 5, will now be described in detail. In the illustrated embodiment, the guide bearer 3 has a profile constructed in the manner of a wide-flanged double-T bearer, however, provided with two intermediate webs 14 between the upper girder 15 and the lower girder 16 for increasing the rigidity against torsion, for the bearer not only has to be precisely rectilinear but also accurately prismatic in the clamped condition. The parallel and optical flat surfaces of the upper and of the lower girder 15 and 16 serve several purposes. The upper girder 15 serves above all for the alignment and fastening of the guide bearer 3 at the vehicle. The fixing bracket 4 clampingly engages hook-like underneath the lateral flange edges of the upper girder 15 and presses the top side of the girder 15 against the bottom edge 17 of the lateral floor girder 7 of the vehicle (FIG. 4). A slender wedge 18 serves for the accurate parallel alignment of the axis of the guide bearer 3 with respect to the normal floor plane of the vehicle in the cross direction, which has to be inserted more or less far on that side of the vehicle at which the guide bearer 3 deviates in the upward direction from the parallelism in the transverse direction without the wedge insert. Frequently, control bores 19 are provided at the vehicle floor in protected places which may serve as reference point for a circle control of certain measurement points. These control bores 19 are provided outside the so-called squeaking zone in the floor area of the rigid passenger cell and within the area of the intersection of cross and longitudinal bearers so that even with a vehicle involved in an accident which is still repairable, the position of these control bores can be assumed as accurate. Such control points may be utilized for facilitating the transverse alignment of the guide bearer, particularly if—as also assumed herein—such control bores are provided pairwise along the same longitudinal position of the vehicle and which may serve as index bores for the guide bearer 3. For this reason, a T-shaped groove 21 which is open toward the top (FIG. 3) is provided at the top side of the guide bearer 3 within a guide member 20, in which are arranged two screws or bolts 23 provided with index bolts, which are adjustable in the width position and are adapted to be matched to the position of the existing index bores. An accurately guided and precisely machined guide disk (FIGS. 3 and 4) serves the accurate relative alignment of the bolt 23 with respect to the guide bearer 3 in the position to be adjusted during the fastening of the bolt 23 and during the tightening of the nut 25. A measurement scale 13 subdivided into length units is provided along one side surface of the upper girder 15, which will be referred to more fully hereinafter.

The surfaces of the lower girder 16 of the guide bearer 3 are machined accurately prismatically, i.e., to provide optical flats. A carriage or slide 26 is guided on the lower girder 16. The guide surfaces at the carriage or slide 26 are of such length and/or are arranged on such a wide basis that the slide or carriage 26 is guided safe against canting in all three axes. A position indicator 27 (FIG. 4) is mounted at the carriage 26 which cooperates with the already mentioned scale 13; the position indicator 27 is adjustable relative to the carriage 26 (by means of the knurled screws 28). The prevailing position of the carriage 26 relative to the guide bearer 3 can be determined by means of the pointer 27 and the scale 13. In order to be able to compensate within certain limits for fastening inaccuracies as regards the width position of the guide bearer 3 with respect to the vehicle center, there is provided a cross displaceability of the pointer 27 which enables such compensation. With an accurate center position of the vehicle slide or carriage 26 accurately determined relative to the vehicle, the pointer 27 can be brought to the pointer position indicating the center position at the scale 13 and may be clamped thereat.

The projector 8 is mounted on the guide slide or carriage 26 by way of the base plate 29. The base plate 29 is pivotally connected at the guide carriage 26 by way of a roller joint generally designated by reference numeral 30 which includes a roller member 31 and joint notches 32 and 33; this roller joint 30 is prestressed by the spring 35 supported at the bracket 34 or at the guide carriage 26. The pivotal bearing support of the base plate 29 is necessary in order to be able to align the optical axis of the projector 8 in the horizontal direction or, more precisely stated, in order to be able to align the optical axis of the projector 8 parallel to the longitudinal axis of the vehicle. An adjusting screw 37 of the base plate 29, which is supported at a bracket 36 of the guide carriage 26, serves for that purpose. By releasing or untightening the screw 37, the base plate 29 is lowered by its own weight and by the spring 38 and the optical axis is tilted somewhat in the clockwise direction; by tightening this screw 37, it is somewhat lifted in the counterclockwise direction.

The accurate vertical alignment of the optical axis of the projector 8 is determined by the manufacturing accuracy of the guide surfaces with respect to their exact transverse alignment and by the assembly accuracy of the projector on the guide carriage 26. The accurate transverse alignment of the projector 8 radiating projection beams on both sides can take place by taking a bearing of two plumbing arms or rulers disposed in front and to the rear of the guide bearer 3, by lateral withdrawal of the guide carriage 26 and of the projector 8 from the guide bearer 3 and by a renewed installation on the guide bearer 3 in a position pivoted through 180° (reversal in position) and by a renewed simultaneous taking of a bearing on the two aforementioned plumbing arms. With an exact transverse alignment of the projector 8 relative to the guide bearer 3, both plumbing arms or rulers must lie on the projection axis also after reversal of the projector.

Diapositives or slides 65 (FIG. 3) are arranged at a suitable place in the beam path within the projector 8 radiating on both sides projection beams which carry the image of a wire cross provided with scaled subdivisions. The picture of this wire cross can be reflected back onto the perpendicular flat end face 66 of the projector 8 by a mirror pressed against a slightly inclined control surface, where it appears laterally and/or vertically offset to the wire cross 67 provided on the end face 66 concentric to the optical axis depending on the direction and magnitude of the deviation of the inclination of the control surface from the vertical. The deviation can be read-off thanks to the scale marking and can be compared with the intended inclination.

A guide rail 39 is mounted at the bottom side of the housing of the projector 8 which serves for the fastening of the roller type measuring tape 9. The guide rail 39 also includes a T-shaped groove, in which a fastening bolt 41 is suspended and by means of which the end of the roller type measuring tape, which is provided with a ring-shaped disk 40, can be clamped fast on the rail 39 without play against displacement; the bolt 41, however, is provided with a clamping sleeve arranged concentric to the disk 40 in such a manner that after the clamping of the bolt 41 in te T-groove, the disk 40 can pivot without play about the bolt 41, from which results the reference point (41') which is required and necessary for the length or longitudinal coordinate measurement. The roll measuring tape 9 has a certain inherent rigidity by reason of its arched configuration so that it does not sag along the lengths to be measured. Additionally, it is equipped with a releasable freewheeling device and with a return spring of conventional type so that after being pulled out of the housing with the measuring tip 9' up to the plumbing arm, it remains in the pulled out length and this length can be read off at the housing. The longitudinal displacement of the end of the roll-measuring tape 9 in the rail 39 is provided in order to be able to undertake relatively positional changes of the roll measuring tape 9 with respect to the position of the guide bearer 3, in such a manner that the zero point of the longitudinal coordinate measurement can be determined independently of the position of the guide bearer 3 to a predetermined position relative to the vehicle. The housing of the roll measuring tape 9 may be secured at the guide rail in case of non-use by a permanent magnet 9''.

A prism support or mount generally designated by reference numeral 42 (FIG. 3) is provided on the top side of the guide rail 39. During normal measurements, this prism support is not present so that it is assured that the light beam emitted by the projector 8 expands accurately rectilinearly. Only in case of control examinations with respect to an accurate vertical superposition of two control or check points within a longitudinal plane, the prism support is used. A prism 44 pivotal about a pivot shaft 43 that extends accurately transversely to the optical axis of the projector 8 and parallel to the guidance of th guide bearer 3 is arranged in the prism support 42; the prism 44 is adapted to be pivoted to and fro by a hand lever 45. The pivot support 43 is arranged in a rotatable ring 46. The ring 46 is rotatable about an axis extending parallel to the optical axis of the projector 8. The accurate horizontal position of the pivot shaft 43 is adjusted on the basis of a detent position which can be overcome by pressure force. In one rotational position of the ring 46 in which the pivot axis is disposed vertical, the ring 46 is also secured in the circumferential position by a detent position. In this adjustment, a bearing can be taken with the prism on two control points disposed horizontally adjacent one another without having to displace the projector 8 on the guide bearer 3. Corresponding controls may also be carried out in suitable planes.

With the embodiment of a plumbing arm or ruler illustrated in FIG. 5, a tablet-shaped permanent magnet 51 is non-detachably and securely inserted in a recess within a pot-shaped synthetic plastic member forming the magnet head generally designated by reference numeral 50. The still-remaining circular recess 52 is constructed so large that it can be slipped without force and without play over the bolt head of a bolt arranged at a control point and thus the magnet head 50 is retained at the bolt head by the permanent magnet. Two pivot pins 53 are provided in the plane of the surface of the permanent magnet at the outside of the magnet head 50 which extend with their geometric axis through the center point of the recess or aperture 52; a pivot bracket 55 provided with a ball support socket member 54 is pivotally mounted centrally on the pivot pins 53. The ball 56 of a plumbing arm or ruler support 56a is suspended in the ball support member 54 which is connected in this manner with the magnet head 50 so as to be movable in all directions (universally movable); in particular with a horizontal arrangement of the pivot axis 53, the axis 57 of the arm or ruler support extends in every case through the center point of the bottom of the aperture 52. The plumbing arm or ruler 61, properly speaking, which is guided without play between the two lateral guide surfaces 58 and is retained by means of the elongated aperture 59 and the clamping bolt 60, is secured at the ruler support 56a. The clamping surface 62 of the ruler or arm support 56a is so arranged that it extends accurately through the center point of the ball 56. On the side of the ruler or arm 61 facing the clamping surface 62, a thin plumbing line 63 is engraved in extension of the axis 57, along which is provided a height scale 64. By reason of the described construction of the individual parts of the plumbing ruler or arm, the plumbing line 63 is in every case an exact reproduction of a plumb line or the like released from the center point of the surface of the bolt head. The individual parts of the plumbing ruler or arm suspended at the ball 56 must be so constructed that the axis of gravity of these parts coincides with the plumb line 63. For purposes of a facilitated finding of an intended height coordinated to a certain control point or check point, there is provided a slide member 77 provided with a cross line 76 which is adapted to be slid up and down along the ruler 61.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for carrying out control measurements of a measurement object, the measurement object having at least one reference measuring axis, the method comprising the steps of:
    mounting a guide means so as to extend transversely of the reference measuring axis
    mounting a single light source for selective displacement on said guide means;
    selecting a plurality of selected measuring control points on the measuring object;
    placing plumb line rulers having measurement control values thereon at the selected measuring control points of the measuring object;
    transmitting at least one light beam from the single light source in a direction substantially parallel to the reference measuring axis of the measurement object;
    selectively displacing the single light source on said guide means to align said at least one light beam with the respective plumb line rulers;
    determining a first coordinate of the measuring object by measuring the displacement of the single light source means along said guide means;
    determining a second coordinate of the measurement object by measuring the distance between the light source and the respective plumb line means; and
    determining a third coordinate of the measuring object by measuring the distance between a control measuring value on the plumb line ruler and the point at which the light beam strikes the plumb line ruler.

2. A method according to claim 1 wherein the step of transmitting at least one light beam consists of emitting a light beam exclusively from the range of the normal visible light.

3. A method according to claim 2, wherein the measuring object is a motor vehicle, and wherein the step of mounting the guidemeans includes connecting the guidemeans to the vehicle frame so as to extend substantially perpendicularly to the vehicle longitudinal axis underneath a vehicle floor.

4. A method according to claim 1, wherein the step of mounting a guide includes disposing the guide means approximately centrally of the measurement object.

5. A method according to claim 1, wherein the step of mounting a guide means includes directly fixedly connecting the guide means to the measuring object.

6. A method according to claim 1, further comprising the step of aligning the guide means on index points of the measurement object.

7. An installation for control measurement of a measuring object, the installation comprising:
    a single light means for emitting a light beam extending substantially parallel to only one coordinate axis of the measuring object, guide means for selectively displaceably guiding the light source means on the measuring object,
    means for mounting said guide means on the measuring object so as to extend perpendicularly to the emitted light beam,
    a plurality of control points provided on the measuring object,
    means mounted at at least one of the respective control points and at the light source means for determining a first coordinate of the measuring object, means for determining a second coordinate of the measuring object between a fixed point and said means mounted at the respective control points, and means for determining a third coordinate of the measuring object indicative of a displacement of said light source means on said guide means.

8. An installation according to claim 7, wherein the measuring object is a motor vehicle frame.

9. An installation according to claim 8, wherein the measuring object is a drive unit attached to the frame.

10. An installation according to claim 8, wherein the measuring object is a drive chassis unit attached to the frame.

11. An installation according to claim 8, wherein the light source means is a projector.

12. An installation according to claim 7, wherein the fixed point is fixed with respect to one of the two parts consisting of the guide means and said light source means.

13. An installation according to claim 12, wherein the measuring object is a motor vehicle frame, and wherein the second coordinate of the measuring object is aligned as accurately as possible parallel to a floor plane of the vehicle and to a longitudinal axis of the vehicle frame.

14. An installation according to claim 13, wherein a vehicle floor is provided and said mounting means for said guide means mounts said guide means to extend perpendicularly to the vehicle longitudinal axis underneath the vehicle floor.

15. An installation according to claim 14, wherein said means for mounting said guide means rigidly connects said guide means with the vehicle floor.

16. An installation according to claim 15, wherein the second coordinate of the measuring object extends parallel to the longitudinal axis of the vehicle frame, and wherein said means for determining the second coordinate includes means for directly mechanically measuring the position of the control points with respect to the fixed point.

17. An installation according to claim 16, wherein the measuring object consists of at least one chassis unit attached to the vehicle frame.

18. An installation according to claim 16, wherein the measuring object consists of at least one drive unit attached to the vehicle frame.

19. An installation according to claim 19, wherein said light beam expands substantially rectilinearly.

20. An installation according to claim 19, wherein said deviation is zero.

21. An installation according to claim 16, wherein at least three control points are provided and wherein a deviation of the at least three control points from an intended position is known.

22. An installation according to claim 16, wherein said light source means emits light beam means exclusively from the range or normal visible light.

23. An installation according to claim 13, wherein said guidemeans includes a rectilinear flat guide bearer means which is bending-rigid in the vertical direction, said light source means including guide carriage means, said guide bearer means including a prismatic guidance for the guide carriage means which absorbs clamping forces in all three mutually perpendicular directions, and said means for mounting said guide means includes means for clamping the guide bearer means to the vehicle floor.

24. An installation according to claim 23, further comprising at least one indexing means on the side of the guide bearer means facing the vehicle floor, said indexing means is coordinated to a corresponding further indexing means arranged at a place of the vehicle floor protected in case of an accident.

25. An installation according to claim 24, wherein said first-mentioned indexing means is an indexing bolt and the further indexing means is an indexing bore.

26. An installation according to claim 25, further comprising means for selectively clamping said first-mentioned indexing means at the guide bearer means in different positions.

27. An installation according to claim 25, wherein said means for clamping the guide bearer means includes one fixing bracket means arranged at the top side of the guide bearer means near each end thereof, said fixing bracket means being longitudinally displaceable and with an opened vehicle door engaging from below over a respective floor longitudinal side girder means.

28. An installation according to claim 27, wherein said guide bearer means is at least as long as the width of the widest vehicle to be measured.

29. An installation according to claim 28, wherein said guide bearer means is longer by at least twice the guide carriage width than the width of the widest vehicle to be measured.

30. An installation according to claim 29, wherein said the light source means is a projector.

31. An installation according to claim 28, further comprising means for adjusting the optical axis of the light source means about a cross axis of the vehicle to obtain a horizontal alignment of the optical axis, said adjusting means being arranged on at least one of the two parts consisting of guide bearer means and guide carriage means.

32. An installation according to claim 31, wherein said adjusting means are provided at both the guide bearer means and guide carriage means.

33. An installation according to claim 31, further comprising adjusting means at the guide bearer means for adjusting the optical axis of the light source means about the vertical axis of the vehicle to provide a longitudinal alignment of the optical axis in such a manner that the relative angle between the displacement direction of the guide carriage means on the guide bearer means and the optical axis of the light source means which is accurately predetermined to be 90°, remains unchanged.

34. An installation according to claim 33, wherein said guide bearer means includes guide tracks, and wherein adjusting means at the guide bearer means adjust the transverse inclination of the guide tracks formed to enable a horizontal alignment of the guide bearer means.

35. An installation according to claim 34, further comprising means for enabling an up and down pivoting of the light beam in a vertical plane without losing the adjusted horizontal position of the optical axis.

36. An installation according to claim 35, further comprising means for enabling a to and fro pivoting of the light beam in a horizontal plane without losing the adjusted longitudinal alignment of the optical axis.

37. An installation according to claim 36, wherein said means for determining a third coordinate of the measuring object includes a scale graduated in length units provided at the guide carriage means, an indicator pointer means cooperating with said scale for enabling a reading-off of the transverse position of the light source means on the guide bearer means, and additional means for enabling a relative displacement and adjustment between said scale and the indicator pointer with an unchanged position of the guide carriage means on the guide bearer means.

38. An installation according to claim 37, wherein said light source means is operable to emit simultaneously light beam means in both directions along the optical axis.

39. An installation according to claim 38, wherein said means for directly mechanically measuring includes a roll tape measuring means, pivot bolt means for supporting said roll tape measuring means to be pivotable about 180°, said pivot bolt means being disposed with its axis coinciding with the optical axis in the verticle plane, said pivot bolt means being supported at least at one of the two parts consisting of guide carriage means and light source means, and wherein the pulled out length of the roll tape measuring means indicates the distance from the tape tip to the center of the pivot bolt means, the center of the pivot bolt means defining the fixed point.

40. An installation according to claim 39 wherein said pivot bolts means is displaceable on its support in the vehicle longitudinal direction and is adapted to be fixed in any desired longitudinal position within the displacement path.

41. An installation according to claim 40, wherein said means for determining the first coordinate of the measuring object is mounted at the light source means and includes at least one slide having the image of a wire cross provided with scale graduation arranged within the light beam path of the light source means being a projector having an end surface disposed perpendicular to the emitted light beam and being provided with a wire cross disposed concentric to the optical axis of the projector.

42. An installation according to claim 41, characterized in that said end face is of light color.

43. An installation according to claim 7 wherein said light source means emits a light beam exclusively from the range of normal visible light.

44. An installation according to claim 7, wherein said guide means includes a rectilinear flat guide bearer means which is bending-rigid in the vertical direction, said light source means includes a guide carriage means, said guide bearer means includes a prismatic guidance for the guide carriage means which absorbs clamping forces in all three mutualy perpendicular directions.

45. An installation according to claim 7, wherein the measuring object is a motor vehicle frame, and wherein the first, the second, and the third coordinates of the measuring object define a coordinate plane which is aligned as accurately as possible parallel to a floor plane of the vehicle with the second coordinate of the measuring object extending parallel to a longitudinal axis of the vehicle frame.

46. An installation according to claim 45, wherein said guide means includes a rectilinear flat guide bearer means which is bending-rigid in the vertical direction, said light source means includes a guide carriage means, said guide bearer means a prismatic guidance for the guide carriage means which absorbs canting forces in all three mutually perpendicular directions.

47. An installation according to claim 46, further comprising at least one indexing means on the side of the guide bearer means facing the vehicle floor, said indexing means is coordinated to a corresponding further indexing means arranged at a place of the vehicle floor protected in case of an accident.

48. An installation according to claim 47 wherein said first-mentioned indexing means is a indexing bolt and the further indexing means is an indexing bore.

49. An installation according to claim 46, wherein said means for mounting said guide means on the measuring object includes one fixing bracket means arranged at the top side of the guide bearer means near each end thereof, said fixing bracket means being longitudinally displaceable and with an opened vehicle door engaging from below over a respective floor longitudinal side girder means.

50. An installation according to claim 49, wherein said guide bearer means is at least as long as the width of the widest vehicle to be measured.

51. An installation according to claim 49, wherein said guide bearer means is longer by at last twice the guide carriage width than the width of the widest vehicle to be measured.

52. An installation according to claim 46, further comprising by means for adjusting the optical axis of the light source means about the cross axis of the vehicle to obtain a horizontal alignment of the optical axis, said adjusting means being arranged on at last one of the two parts consisting of guide bearer means and guide carriage means.

53. An installation according to claim 46, further comprising adjusting means at the guide bearer means for adjusting the optical axis of the light source means about the vertical axis of the vehicle to provide a longitudinal alignment of the optical axis in such a manner that the relative angle between the displacement direction of the guide carriage means on the guide bearer means and the optical axis of the light source means which is accurately predetermined to be 90°, remains unchanged.

54. An installation according to claim 46, wherein said guide bearer means includes guide tracks, and wherein adjusting means at the guide bearer means adjust the transverse inclination of the guide tracks formed to enable a horizontal alignment of the guide bearer means.

55. An installation according to claim 46, further comprising means for enabling an up and down pivoting of the light beam in a vertical plane without losing the adjusted horizontl position of the optical axis.

56. An installation according to claim 46 further comprising means for enabling a to and fro pivoting of the light beam in a horizontal plane without losing the adjusted longitudinal alignment of the optical axis.

57. An installation according to claim 46, wherein said means for determining a third coordinate of the measuring object includes a scale graduated in length units provided at the guide carriage means, an indicator pointer means cooperating with said scale for enabling a reading-off of the transverse position of the light source means on the guide bearer means, and additional means for enabling a relative displacement and adjustment between said scale and the indicator pointer with an unchanged position of the guide carriage means on the guide bearer means.

58. An installation according to claim 46, wherein said means for determining the second coordinate of the measuring object includes mechanical measuring means having a roll tape measuring means, pivot bolt means for supporting said roll tape measuring means to pivotable about 180°, said pivot bolt means being disposed with its axis coinciding with the optical axis in the vertical plane, said pivot bolt means being supported at least at one of the two parts consisting of the guide carriage means and the light source means, and wherein the pulled out length of the roll tape measuring means indicates the distance from the tape tip to the center of the pivot bolt means, the center of the pivot bolt means defining the fixed point.

59. An installation according to claim 58, wherein said pivot bolt means is displaceable on its support in the vehicle longitudinal direction and is adapted to be fixed in any desired longitudinal position within the displacement path.

60. An installation according to claim 56, wherein said means for determining the first coordinate includes at least one slide having the image of a wire cross provided with scale graduation arranged within the light beam path of the light source means, the light source means being a projector having an end surface disposed perpendicular to the emitted beam and being provided with a wire cross disposed concentric to the optical axis of the projector.

61. An installation according to claim 7 wherein said means for determining a first coordinate of the measuring object includes at least one slide having the image of a wire cross provided with scale graduation arranged within the beam path of the light source means, the light source means being a projector having an end surface disposed perpendicular to the emitted beam and being provided with a wire cross disposed concentric to the optical axis of the projector.

62. An installation according to claim 61, wherein said end face is of light color.

63. An installation according to claim 7, wherein said light source means is operable to emit simultaneously a light beam in both directions along the optical axis.

64. An installation according to claim 63, wherein said light source means emits a light beam exclusively from the range of normal visible light.

* * * * *